United States Patent
Mieritz et al.

(10) Patent No.: US 12,546,718 B2
(45) Date of Patent: Feb. 10, 2026

(54) SILANE-FLUOROPHORE COMPLEX INDICATOR FLUORIDE MEASUREMENT

(71) Applicant: Hach Company, Loveland, CO (US)

(72) Inventors: Daniel Gustav Mieritz, Fort Collins, CO (US); Darren Kent MacFarland, Windsor, CO (US)

(73) Assignee: HACH COMPANY, Loveland, CO (US)

( * ) Notice: Subject to any disclaimer, the term of this patent is extended or adjusted under 35 U.S.C. 154(b) by 600 days.

(21) Appl. No.: 18/078,153

(22) Filed: Dec. 9, 2022

(65) Prior Publication Data
US 2024/0192136 A1    Jun. 13, 2024

(51) Int. Cl.
| | |
|---|---|
| B01L 7/00 | (2006.01) |
| B01D 15/08 | (2006.01) |
| B01F 33/302 | (2022.01) |
| B01F 33/3033 | (2022.01) |
| B01L 3/00 | (2006.01) |
| B01L 9/00 | (2006.01) |
| B65G 47/80 | (2006.01) |
| B82Y 20/00 | (2011.01) |
| B82Y 30/00 | (2011.01) |
| B82Y 40/00 | (2011.01) |

(Continued)

(52) U.S. Cl.
CPC ......... *G01N 21/6428* (2013.01); *G01N 33/52* (2013.01); *A61B 5/0071* (2013.01); *A61K 8/498* (2013.01); *A61K 49/0039* (2013.01); *C08L 2312/08* (2013.01); *C12Q 2334/20* (2013.01); *C12Q 2337/20* (2013.01); *G01N 2021/6439* (2013.01)

(58) Field of Classification Search
CPC ............... G01N 21/6428; G01N 33/52; G01N 2021/6439; G01N 33/182; G01N 31/22
See application file for complete search history.

(56) References Cited

U.S. PATENT DOCUMENTS

| | | | |
|---|---|---|---|
| 2016/0123967 A1* | 5/2016 | Gu | C12Q 1/04 435/7.32 |
| 2016/0363588 A1* | 12/2016 | Kawano | G01N 33/689 |

FOREIGN PATENT DOCUMENTS

WO    WO-2022061363 A1 *    3/2022    ......... A61K 51/1217

OTHER PUBLICATIONS

Elsayed, Sameh, et al. "An instantaneous and highly selective chromofluorogenic chemodosimeter for fluoride anion detection in pure water." ChemistryOpen 2.2 (2013): 58. (Year: 2013).*

(Continued)

*Primary Examiner* — Jennifer Wecker
*Assistant Examiner* — Oyeleye Alexander Alabi
(74) *Attorney, Agent, or Firm* — Ference & Associates LLC

(57) ABSTRACT

An embodiment provides a method for measuring an analyte component of an aqueous sample, including: introducing an indicator solution to the aqueous sample, wherein the indicator solution comprises a plurality of micelles, wherein an indicator is within the micelles and the plurality of micelles is assembled from a cationic surfactant to form an indicator solution; and measuring an analyte component concentration of the aqueous sample, wherein the measuring comprises measuring a change in fluorescence in the aqueous sample, wherein the change in fluorescence is responsive to the analyte component interacting with the indicator. Other aspects are described and claimed.

20 Claims, 14 Drawing Sheets

(51) Int. Cl.

| | |
|---|---|
| C12M 1/34 | (2006.01) |
| C12M 3/06 | (2006.01) |
| C12N 1/14 | (2006.01) |
| C12N 1/20 | (2006.01) |
| C12Q 1/02 | (2006.01) |
| C12Q 1/6806 | (2018.01) |
| C12Q 1/6844 | (2018.01) |
| C12Q 1/6848 | (2018.01) |
| C12Q 1/686 | (2018.01) |
| G01N 15/10 | (2024.01) |
| G01N 15/14 | (2024.01) |
| G01N 15/1433 | (2024.01) |
| G01N 21/29 | (2006.01) |
| G01N 21/64 | (2006.01) |
| G01N 21/65 | (2006.01) |
| G01N 30/02 | (2006.01) |
| G01N 30/72 | (2006.01) |
| G01N 33/52 | (2006.01) |
| G01N 33/543 | (2006.01) |
| G01N 33/557 | (2006.01) |
| G01N 33/574 | (2006.01) |
| G01N 33/58 | (2006.01) |
| A61B 5/00 | (2006.01) |
| A61K 8/49 | (2006.01) |
| A61K 49/00 | (2006.01) |

(56) References Cited

OTHER PUBLICATIONS

Chavali, Ravi, et al. "Rapid detection of fluoride in potable water using a novel fluorogenic compound 7-O-tert-butyldiphenylsilyl-4-methylcoumarin." Analytical Chemistry Research 6 (2015): 26-31. (Year: 2015).*

Ivan, Marius G., et al. "On the question of acid generation upon 157-nm laser exposure of fluorinated polymers." Chemistry of materials 18.11 (2006): 2635-2641. (Year: 2006).*

Bo Qiu et al., "Forster Resonance Energy-Transfer-Based Ratiometric Fluorescent Indicator for Quantifying Fluoride Ion in Water and Toothpaste", ACS Omega, 2018, 7 pages, ACS Publications, American Chemical Society.

Xinling Yu et al., "Multicolorful ratiometric-fluorescent test paper for determination of fluoride ions in environmental water", RSC Advances, 2017, 6 pages, The Royal Society of Chemistry.

Bo Qiu et al., "A colorimetric and ratiometric fluorescence sensor for sensitive detection of fluoride ions in water and toothpaste", RSC Advances, 2016, 6 pages, The Royal Society of Chemistry.

International Search Report and Written Opinion, European Patent Office, Mar. 12, 2024, 12 pages, European Patent Office.

Sameh Elsayed et al., "An Instantaneous and Highly Selective Chromofluorogenic Chemodosimeter for Fluoride Anion Detection in Pure Water", Chemistry Open Communications, Apr. 2013, 5 pages, vol. 2, No. 2, XP093136165, Wiley-VCH Verlag Gmbh & Co. KGaA, Weinheim.

Ravi Chavali et al., "Rapid detection of fluoride in potable water using a novel fluorogenic compound 7-0-tert-butyldiphenylsilyl-4-methylcoumarin", Analytical Chemistry Research, Oct. 19, 2015, 6 pages, vol. 6, XP093136445, Elsevier B.V.

Lorena K. Calderon-Ortiz et al., "Hydroxythiazole-Based Fluorescent Probes for Fluoride Ion Detection", European Journal of Organic Chemistry, Mar. 14, 2012, 7 pages, XP072112302, Wiley.

Chunchang Zhao et al., "Construction of BODIPY-CTAB assembles for ratiometric fluorescence pH measurements in complete water system", Dyes and Pigments, Oct. 9, 2013, 6 pages, vol. 101, XP028772060, Elsevier.

Haiyu Tian et al., "Colorimetric and ratiometric fluorescent detection of sulfite in water via cationic surfactant-promoted addition of sulfite to [alpha], [beta]-unsaturated ketone", Analytica Chimica ACTA, Jun. 20, 2013, 6 pages, Volumte 788, XP028671906, Elsevier.

* cited by examiner

SILANE-FLUOROPHORE COMPLEX INDICATOR FLUORIDE MEASUREMENT

FIELD

This application relates generally to measurement of fluoride in a sample, and, more particularly, to measurement of fluoride of a low concentration using micelles.

BACKGROUND

The measurement of analytes, such as fluoride, in water with highly-controlled solute composition, such as in ultra-high purity applications and other applications where the matrix is precisely controlled, has several important applications. With respect to fluoride, some applications require removal of even extremely small amounts, and others require the quantification of extremely small amounts for various analytical applications. Small amounts of fluoride can cause etching of silicon for semiconductor manufacturing which is a huge problem when features are fabricated with atomic precision. Further, primary contaminants of fluoride-containing compounds can be degraded to liberate fluoride, which can be measured as a secondary analyte to understand the primary contaminant level.

BRIEF SUMMARY

In summary, one embodiment provides a method for measuring an analyte component of an aqueous sample, comprising: introducing an indicator solution to the aqueous sample, wherein the indicator solution comprises a plurality of micelles, wherein an indicator is within the micelles and the plurality of micelles is assembled from a cationic surfactant to form an indicator solution; and measuring an analyte component concentration of the aqueous sample, wherein the measuring comprises measuring a change in fluorescence in the aqueous sample, wherein the change in fluorescence is responsive to the analyte component interacting with the indicator.

Another embodiment provides a composition for measuring an analyte component in an aqueous sample, comprising: a silane-fluorophore complex indicator; and a plurality of micelles, wherein the silane-fluorophore complex indicator is within the micelles and the plurality of micelles is assembled from a cationic surfactant.

A further embodiment provides a composition for measuring fluoride in an aqueous sample, comprising: a silane-fluorophore complex indicator, wherein a change in fluorescence is based upon an interaction of the silane-fluorophore complex indicator and an amount of fluoride in the aqueous sample; and a plurality of micelles, wherein the silane-fluorophore complex indicator is within the micelles and the plurality of micelles is assembled from a cationic surfactant.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
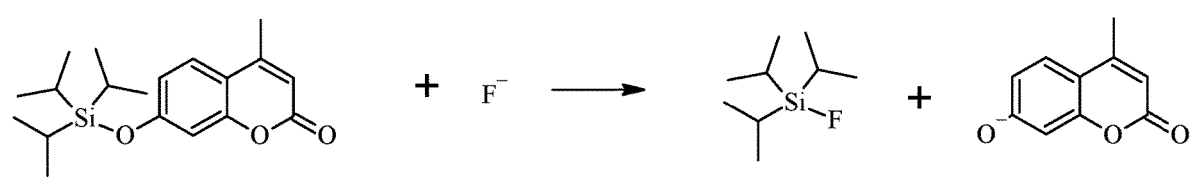
FIG. 1 illustrates a reaction scheme of TIPS-Mumb (7-triisopropylsiloxy-4-methylcoumarin) with fluoride in an embodiment.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well-known structures, materials, or operations are not shown or described in detail. The following description is intended only by way of example, and simply illustrates certain example embodiments.

Conventionally, measuring ultra-low range (ULR) fluoride, around 10 ppb (parts-per-billion or micrograms-per-Liter, μg/L) fluoride, is challenging for existing techniques.

Example lab methods include colorimetric, potentiometric and chromatographic which are not typically sensitive enough to reach the required 10 ppb and may be resource intensive. Previous indicators and methods of detection may use a hydrophobic indicator. Such an indicator may use a solvent system such as 70% ethanol. In an embodiment, the solvent may be an alcohol. This solvent may greatly increase the detection limit. This higher detection limit may occur since the indicator may interact with water and a signal must be disentangled from the signal produced from a reaction with fluoride. Such a system introduced error into a measurement. Developing a test for ULR fluoride in water may require an indicator that is affordable, manufacturable, and has the right characteristics to reach low detection limits.

Accordingly, the systems and methods described herein provide a technique for fluoride measurement in low concentration in a sample. Other analyte components may be measured using the technique. The indicator disclosed herein may be a silane-fluorophore complex or compound. As an example, the indicator may be 7-triisopropylsiloxy-4-methylcoumarin (TIPS-Mumb), 7-tert-butyl(diphenyl)siloxy-4-methylcoumarin (Ph2tBu-Mumb), a combination, or the like. The indicator may be present with micelles. In other words, the indicator may be contained within the hydrophobic region of a plurality of micelles. The indicator may be used in the presence of a surfactant. The surfactant may be cationic. The surfactant may be cetyltrimethylammonium bromide (CTAB), benzyldimethylhexadecylammonium chloride (BDAC), dodecyltrimethylammonium bromide (DTAB), a combination thereof, or the like. The surfactant and micelle may enhance the indicator signal and/or increase the shelf life of the indicator. In an embodiment, the fluorescent signal may correlate to an amount of concentration of fluoride or other analyte within an aqueous sample.

The illustrated example embodiments will be best understood by reference to the figures. The following description is intended only by way of example, and simply illustrates certain example embodiments.

Figure 2:
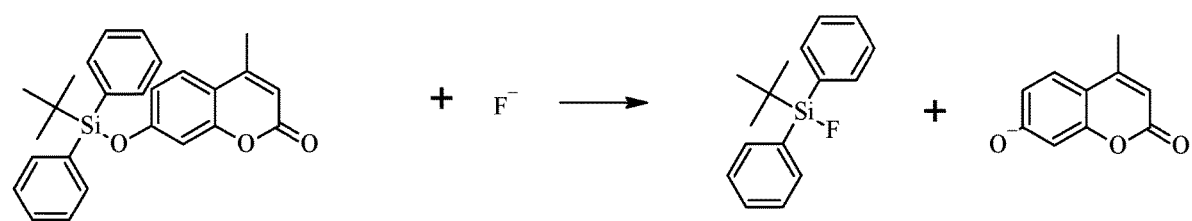
FIG. 2 illustrates a reaction scheme of Ph2tBu-Mumb (7-tert-butyl(diphenyl)siloxy-4-methylcoumarin) with fluoride in an embodiment.

In an embodiment, an indicator may be used to determine an analyte such as fluoride in a sample. In an embodiment, the indicator may be TIPS-Mumb. Referring to FIG. 1, in an embodiment, a TIPS-Mumb indicator and reaction with fluoride is illustrated. In an embodiment, the indicator may be Ph2tBu-Mumb. Referring to FIG. 2, in an embodiment, a Ph2tBu-Mumb indicator and reaction with fluoride is illustrated. In an embodiment, the indicator may be within a micelle or micelle complex. An indicator may be present within the hydrophobic center region of a micelle. In other words, an indicator may be present within a micelle in a hydrophobic region within the hydrophilic outer portion of the micelle.

Figure 3:
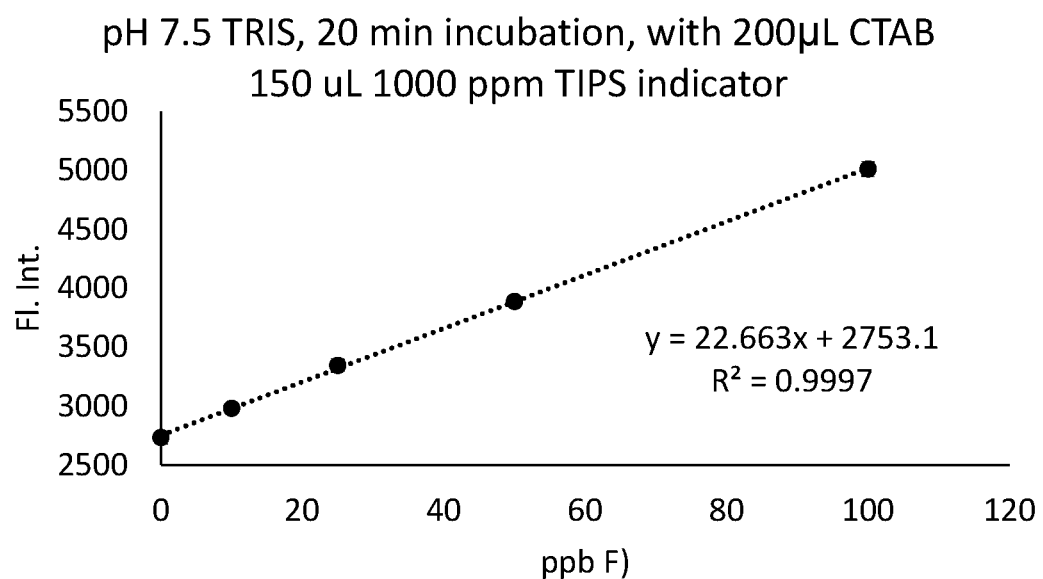
FIG. 3 illustrates sample data of TIPS-Mumb with CTAB to measure fluoride.
Figure 4:
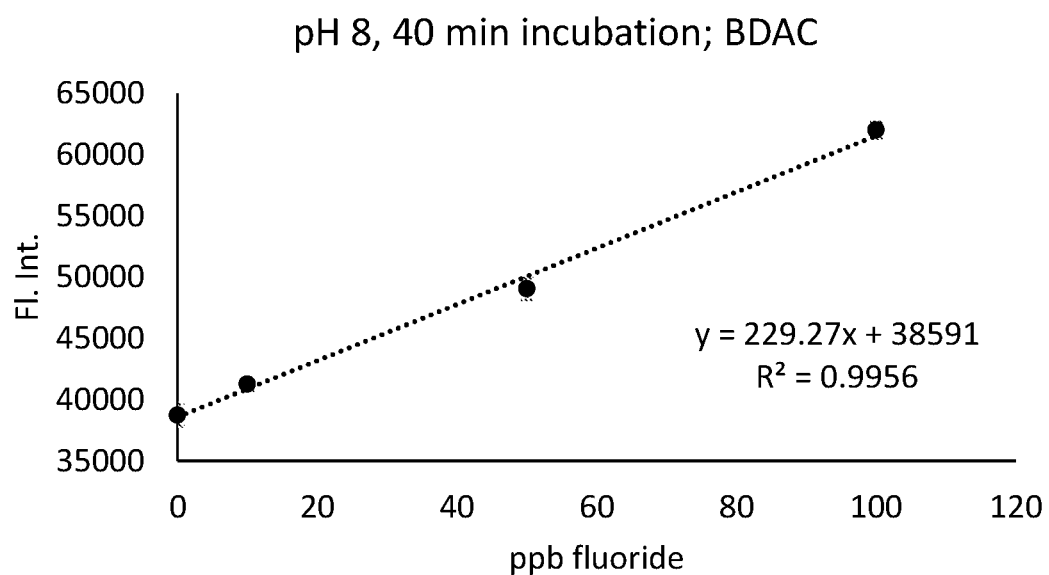
FIG. 4 illustrates sample data of TIPS-Mumb with BDAC to measure fluoride.
Figure 5:
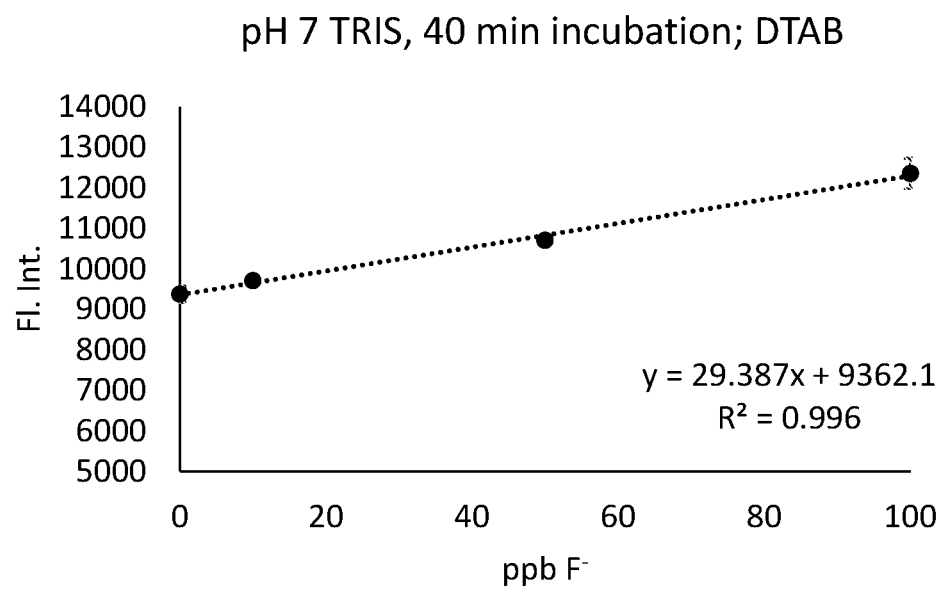
FIG. 5 illustrates sample data of TIPS-Mumb with DTAB to measure fluoride.

In an embodiment, a surfactant may be added to a sample. The surfactant may be cetyltrimethylammonium bromide (CTAB), benzyldimethylhexadecylammonium chloride (BDAC), dodecyltrimethylammonium bromide (DTAB), a combination thereof, or the like. A surfactant, such as CTAB, may be used to solubilize hydrophobic fluoride indicators in an aqueous system. Referring to FIG. 3, in an embodiment, sample fluorescent data CTAB at pH 7.5 with a 20 min incubation is illustrated. Other example surfactants such as BDAC (See FIG. 4) and DTAB (See FIG. 5) may be used. However, in such applications the water sample is nearly pure with only very low concentrations of buffer (~10 mM). The surfactant may also serve to inhibit the reaction between water and the indicator and/or to substantially increase the quantum yield of the fluorescent molecules released after the indicator reacts with fluoride. In an embodiment, an indicator is used with ~12.5 mM of pH 8 TRIS buffer.

Figure 6:
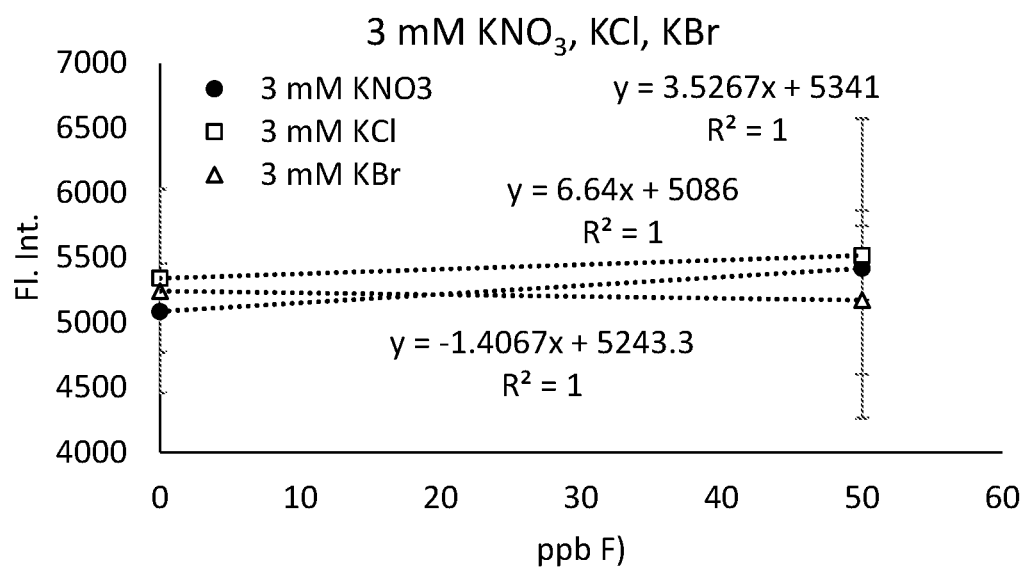
FIG. 6 illustrates example data of TIPS-Mumb with CTAB in the presence of salts reducing the indicator signal.
Figure 7:
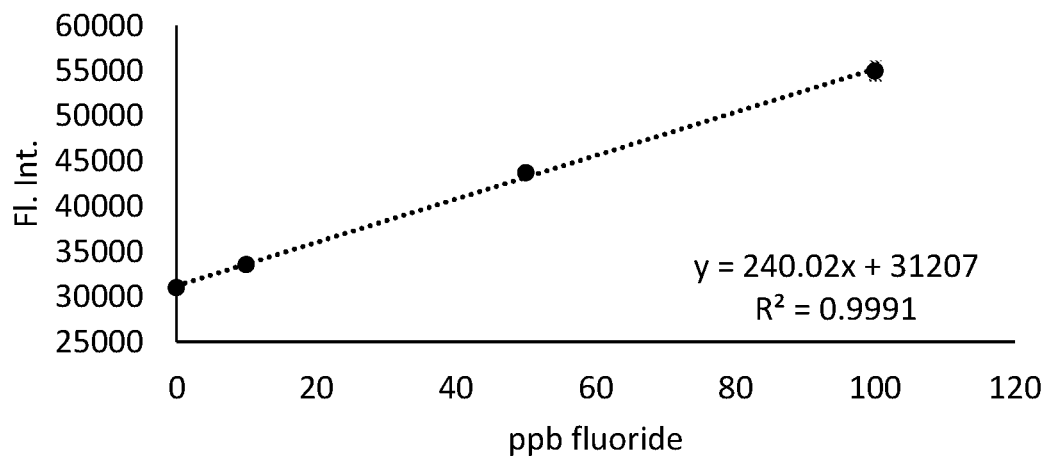
FIG. 7 illustrates example data of TIPS-Mumb with CTAB and ethanol in the presence of salts.

In an embodiment, addition of a dilute salt to the samples (~3 mM of salt) removes the response to fluoride. Referring to FIG. 6, in an embodiment, sample data in the presence of salts reduces the fluoride response. In an embodiment, sample conditions may use 3 mM of $KNO_3$, KCl, or KBr. To solve the problem, surfactant concentrations may be adjusted and/or include additives such as ethanol. Referring to FIG. 7, in an embodiment, sample data of a high CTAB concentration restores the fluoride response. Illustrative conditions include pH 7 TRIS buffer, 25 min incubation, 55 mM CTAB, 9% ethanol, and 2.1 mM $KNO_3$. These experimental conditions and concentrations are illustrative, and other parameters may be used.

Figure 8:
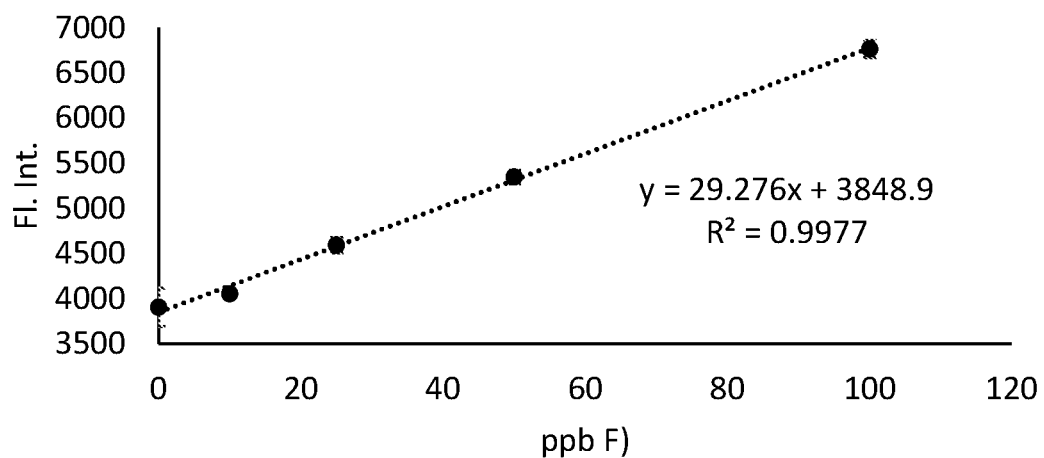
FIG. 8 illustrates example data of Ph2tBu-Mumb with CTAB and ethanol in the presence of salts.

The method may use indicators that contain different silane-moieties. Referring to FIG. 8, in an embodiment, a Ph2tBu-Mumb indicator with CTAB is illustrated. Illustrative conditions include pH 8, 20 min incubation, 55 mM CTAB, and 3 mM $KNO_3$. For example, when other cationic surfactants such as BDAC instead of CTAB, the response is enhanced, and other cationic surfactants such as DTAB work as well.

Figure 9:
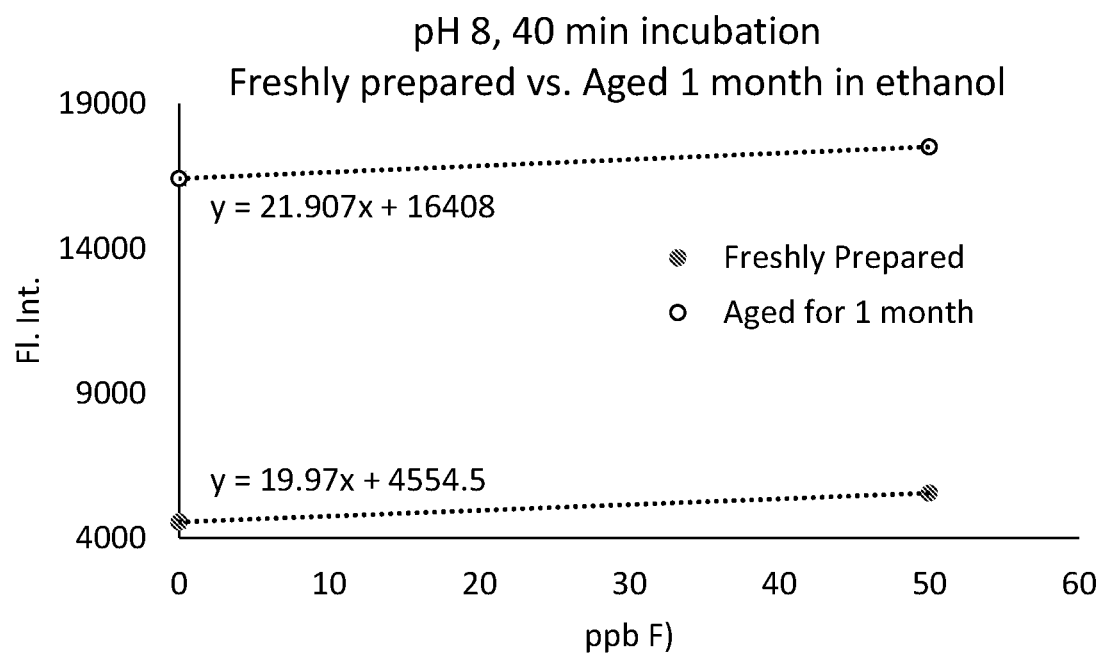
FIG. 9 illustrates example data of an indicator aged 1 month in ethanol.
Figure 10:
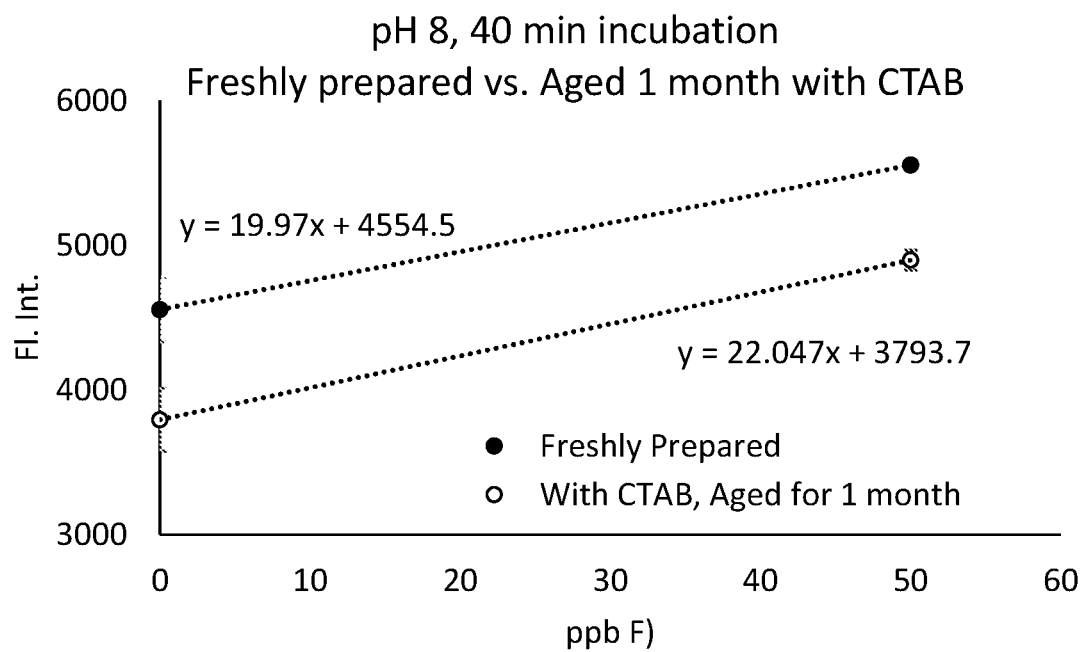
FIG. 10 illustrates example data of an indicator with CTAB aged 1 month in ethanol.
Figure 11:
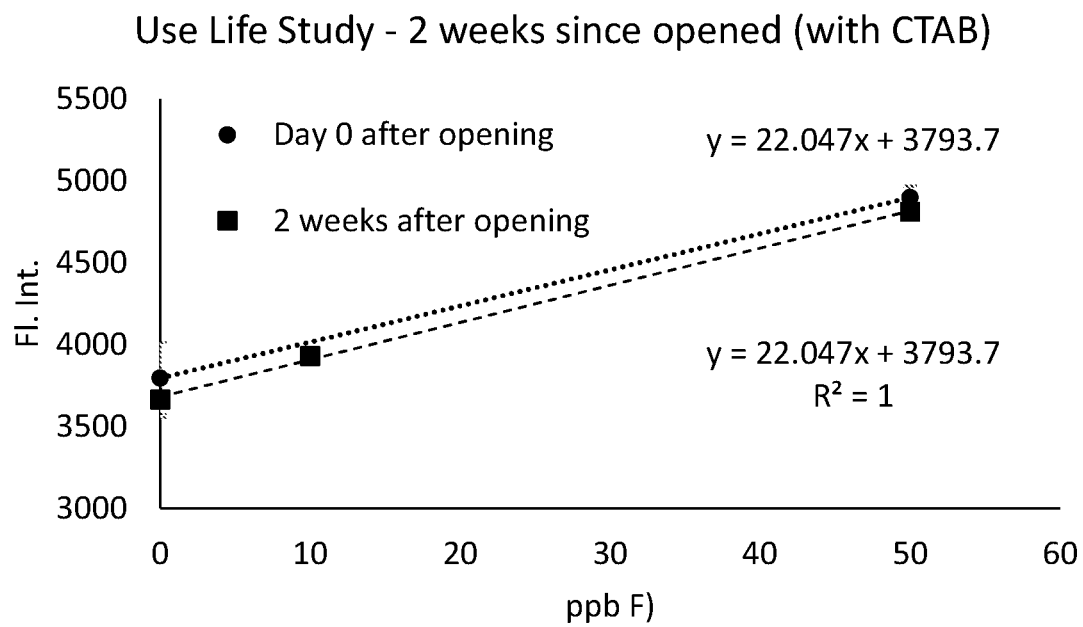
FIG. 11 illustrates example data of an indicator use life study 2 weeks after opening in the presence of CTAB.
Figure 12:
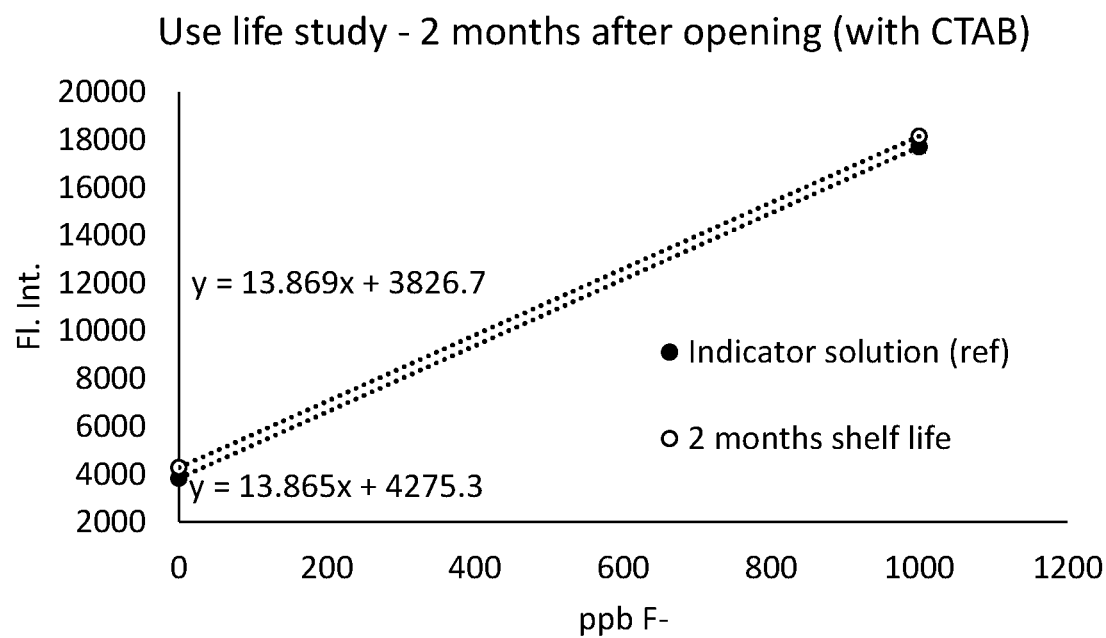
FIG. 12 illustrates example data of an indicator use life study 2 months after opening in the presence of CTAB.
Figure 13:
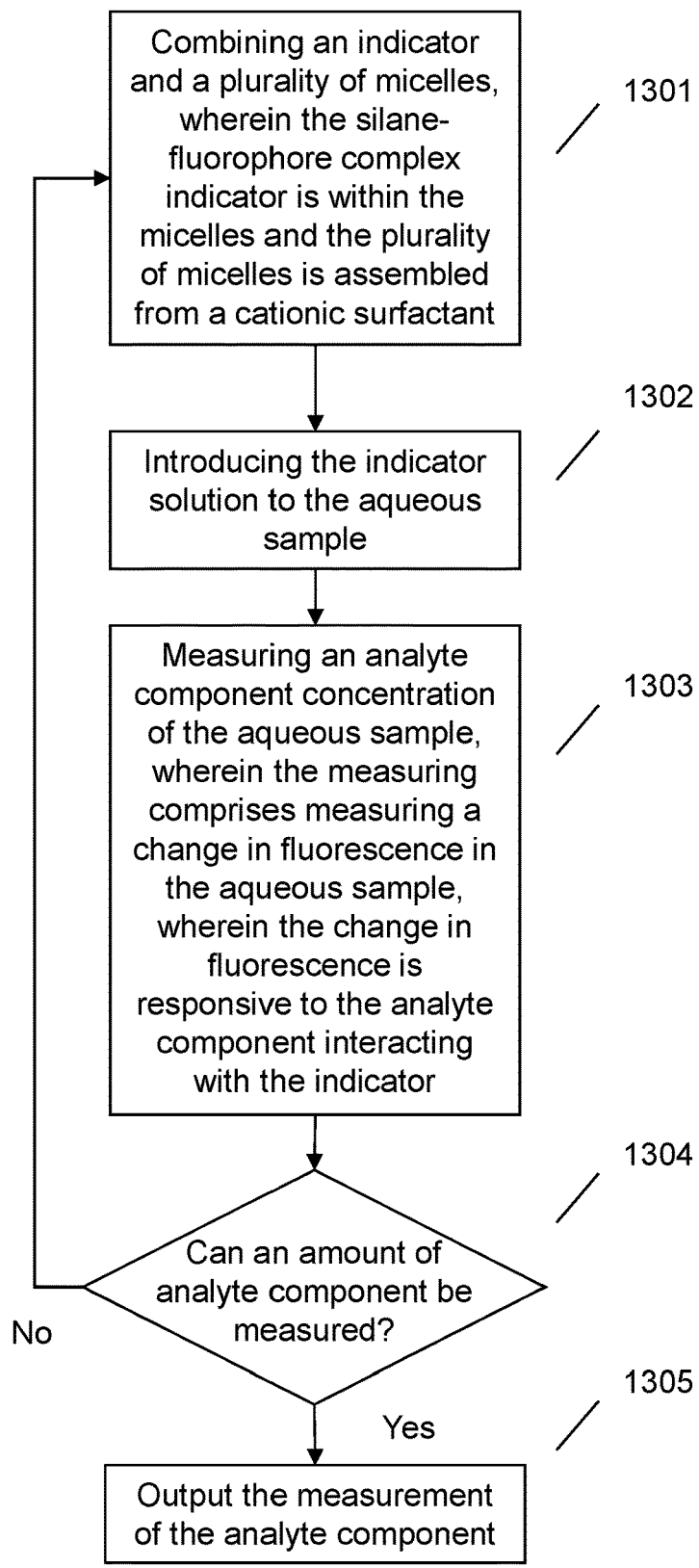
FIG. 13 illustrates flow diagram of measuring a component in an aqueous sample.

In an embodiment, an indicator may be stabilized in an alcohol solution. Protic chemicals (i.e. water, ethanol solvent, etc.) react with the fluoride indicator in solution. This reaction may cause degradation and shorten the shelf and use life of the solution. Referring to FIG. 9, in an embodiment, this effect may be seen by the increase in the y-intercept after aging for 1 month. In an embodiment, surfactants in the solution, in a high enough concentration to form micelles, may reduce or eliminate degradation. For example, saturated CTAB in ethanol may prevent the reaction between ethanol and the indicator and may preserve the shelf life for 2 weeks or even longer than 1 month (See FIG. 10 and FIG. 11), and may provide for a use life of at least 2 months if water is excluded from the solution (See FIG. 12).

At 1301, in an embodiment, a fluoride indicator may be prepared. The method and composition may be for any ionic analyte measurement. For ease of reading fluoride is used as an exemplar. The indicator may be a silane-fluorophore complex indicator. The indicator may be TIPS-Mumb, Ph2tBu-Mumb, a combination, or the like. In the absence of fluoride, the indicator may be of a low fluorescence or non-fluorescent. In the presence of fluoride, the indicator may be more fluorescent or fluorescent. In other words, the amount or intensity of fluorescence may change in the presence or absence of fluoride. Thus, when the indicator is exposed to fluoride the aqueous solution may experience a change in fluorescence. The indicator may be present with micelles, or within micelles. In an embodiment, alcohol or an amount of alcohol may be present. In an embodiment, the alcohol may be ethanol. In an embodiment, a plurality of micelles may be present, wherein the silane-fluorophore complex indicator is within the micelles and the plurality of micelles is assembled from a cationic surfactant.

At 1302, in an embodiment, the indicator and micelle solution may be introduced into a solution to be measured. A surfactant may also be used. The indicator may be placed into a solution at room temperature. The aqueous sample may contain an amount of fluoride. In an embodiment, the fluoride may cause a change in the intensity of fluorescence within the solution upon reacting with the indicator within the solution. The change in intensity of fluorescence may be proportional to the amount of fluoride in the solution. The fluorescence may be triggered or increased based upon an interaction of the amount of fluoride with the indicator.

In an embodiment, the indicator may be placed in a solution, aqueous sample, water sample or the like. The solution may be titrated or buffered. The titration may be to about equal to, above, or below a pH range of about 7.0 to about 8.0. In an embodiment, a pH value may be selected to minimize interferences. The surfactant may allow for an enhancement in the intensity of the fluorescence and/or to increase a shelf life of the indicator and/or to solubilize the indicator in aqueous solution.

The solution may be an aqueous sample which may include a sample from a natural body of water, a holding tank, a processing tank, a pipe, or the like. The solution may be in a continuous flow, a standing volume of liquid, or any combination thereof. In one embodiment, the solution may be introduced to the indicator or indicator mix, for example, a test chamber of the measurement device. In an embodiment, the measurement device may be a hand-held device. A hand-held device may have advantages such as lower cost, portability, field use, or the like. Alternatively, the measurement device may be a larger bench top device or a process analyzer. Introduction of the solution into the measurement device may include placing or introducing the solution into a test chamber manually by a user or using a mechanical means, for example, gravity flow, a pump, pressure, fluid flow, or the like. For example, a water sample for fluoride measurement may be introduced to a measurement or test chamber using a pump. In an embodiment, valves or the like may control the influx and efflux of the solution into or out of the one or more chambers, if present.

A chamber, vessel, cell, chamber, or the like may contain an aqueous sample, at least one indicator, and associated reagents such as micelles, surfactants, acids, bases, and/or mitigation agents. A device may contain one or more bottles of reagents which contain necessary reagents. The reagents contained in the one or more bottles may be pump fed or gravity fed. The flow of the reagents may be metered to ensure proper volume delivery to the measurement cell. The aqueous sample may be fed through a pressured inlet, a vessel, or the like. The aqueous sample may be introduced into the measurement chamber by a pump or gravity fed. The sampling device may be in series or parallel to an aqueous flow. The device may have a system to ensure proper mixing of the aqueous sample, indicator, and related reagents.

Additionally or alternatively, the measurement device may be present or introduced in a volume of the solution. The measurement device is then exposed to the volume of solution where it may perform measurements. The system may be a flow-through system in which a solution and/or reagents are automatically mixed and measured. Once the sample is in contact with the measurement system, the system may measure the fluoride of the sample, as discussed in further detail herein. In an embodiment, the measurement device may include one or more chambers in which the one or more method steps may be performed.

At 1303, in an embodiment, the system and method may measure an amount of fluoride in the solution by measuring a change in the intensity of the fluorescence caused by the fluoride reacting with the indicator. In an embodiment, the presence of fluoride in an aqueous solution may cause an increase in fluorescence intensity. In an embodiment, the fluoride may interact with the indicator. Thus, the change in fluorescence of the solution may be proportional to the amount of fluoride within the solution. Accordingly, a measurement device or user can correlate the measured change in fluorescence with the amount of fluoride in the solution.

At 1304, in an embodiment, the system and method may determine if an amount of analyte may be measured. For example, an amount of analyte may be measured using fluorometric methods. The measurements may be compared to expected values, historical values, or the like. Measurement may be at periodic intervals set by the user or preprogrammed frequencies in the device. Measurement of analyte by a device allows for real time data with very little human involvement in the measurement process. In the event that the system outputs an unexpected value, the system may automatically request re-measurement of a solution or sample.

A programmed calibration curve may be entered into the device for calibrating the measurement device. In an embodiment, the system and method may be periodically tested using a known amount of analyte in the sample. The system may then recalibrate or send an error report for maintenance. In the event that the error is caused by an unclean device or that the device otherwise needs cleaned, the system may implement a cleaning cycle. Cleaning of the fluorometric chamber may be required at an unspecified time interval, after a certain number of measurements, upon user or system request, or the like. In an embodiment, a cleaning cycle of the device may be performed using either automated or manual methods.

At 1304, in an embodiment, if a concentration of analyte cannot be determined, the system may continue to measure an analyte and/or a fluorescent signal. Additionally or alternatively, the system may output an alarm, log an event, or the like. If a concentration of analyte can be determined, the system may provide a measurement of analyte concentration at 1305. The measurement which may be the fluorescent intensity or analyte concentration may be an output that is provided to a device in the form of a display, printing, storage, audio, haptic feedback, or the like. Alternatively or additionally, the output may be sent to another device through wired, wireless, fiber optic, Bluetooth®, near field communication, or the like.

The various embodiments described herein thus represent a technical improvement to conventional methods and instrument fluoride or other analyte component measurement. Using the techniques as described herein, an embodiment may use a method and composition for an instrument for analyte measurement. This is in contrast to conventional methods with limitations mentioned above. Such techniques provide a better method to measure fluoride or other analyte components.

Figure 14:
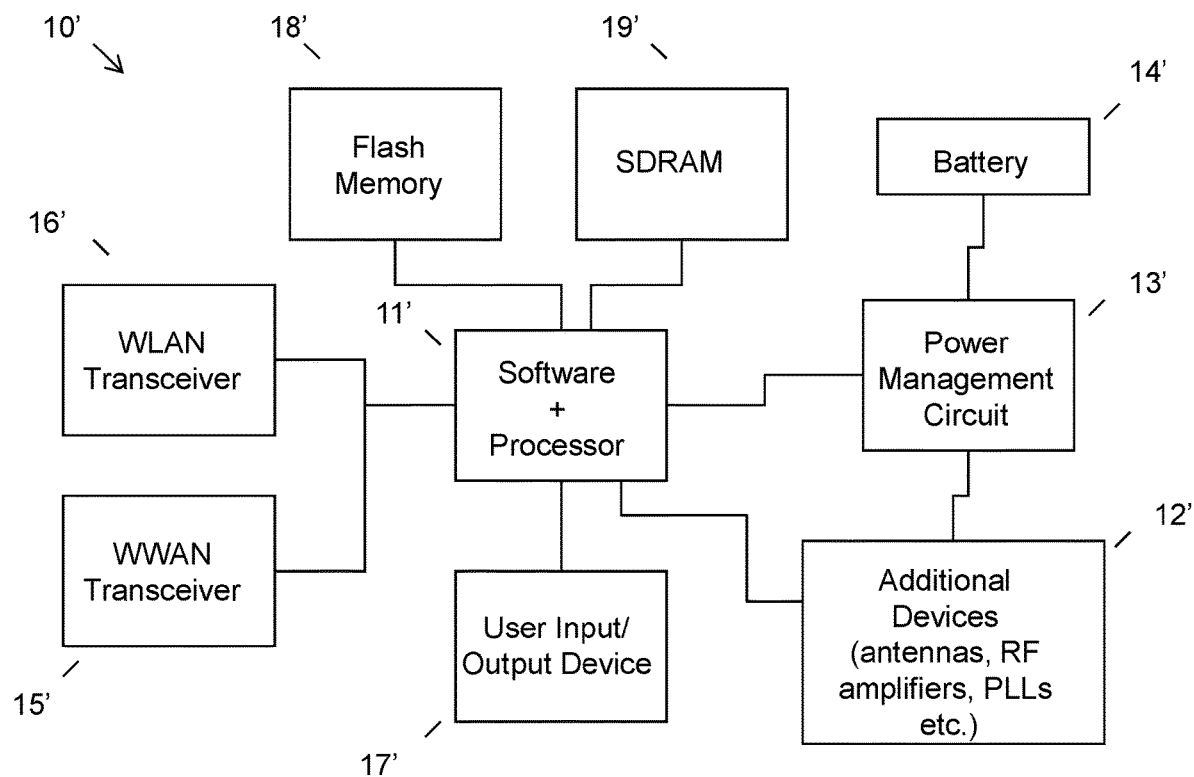
FIG. 14 illustrates an example of computer circuitry.

While various other circuits, circuitry or components may be utilized in information handling devices, with regard to an instrument for analyte measurement according to any one of the various embodiments described herein, an example is illustrated in FIG. 14. Device circuitry 10' may include a measurement system on a chip design found, for example, a particular computing platform (e.g., mobile computing, desktop computing, etc.) Software and processor(s) are combined in a single chip 11' Processors comprise internal arithmetic units, registers, cache memory, busses, I/O ports, etc., as is well known in the art. Internal busses and the like depend on different vendors, but essentially all the peripheral devices (12') may attach to a single chip 11'. The circuitry 10' combines the processor, memory control, and I/O controller hub all into a single chip 11'. Also, systems 10' of this type do not typically use SATA or PCI or LPC. Common interfaces, for example, include SDIO and I2C.

There are power management chip(s) 13', e.g., a battery management unit, BUM, which manage power as supplied, for example, via a rechargeable battery 14', which may be recharged by a connection to a power source (not shown). In at least one design, a single chip, such as 11', is used to supply BIOS like functionality and DRAM memory.

System 10' typically includes one or more of a WWAN transceiver 15' and a WLAN transceiver 16' for connecting to various networks, such as telecommunications networks and wireless Internet devices, e.g., access points. Additionally, devices 12' are commonly included, e.g., a transmit and receive antenna, oscillators, PLLs, etc. System 10' includes input/output devices 17' for data input and display/rendering (e.g., a computing location located away from the single beam system that is easily accessible by a user). System 10' also typically includes various memory devices, for example flash memory 18' and SDRAM 19'.

It can be appreciated from the foregoing that electronic components of one or more systems or devices may include, but are not limited to, at least one processing unit, a memory, and a communication bus or communication means that couples various components including the memory to the processing unit(s). A system or device may include or have access to a variety of device readable media. System memory may include device readable storage media in the form of volatile and/or nonvolatile memory such as read only memory (ROM) and/or random access memory (RAM). By way of example, and not limitation, system memory may also include an operating system, application programs, other program modules, and program data. The disclosed system may be used in an embodiment of an instrument for analyte measurement.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device, where the instructions are executed by a processor. In the context of this document, a storage device is not a signal and "non-transitory" includes all media except signal media.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and products according to various example embodiments. It will be understood that the actions and functionality may be implemented at least in part by program instructions. These program instructions may be provided to a processor of a device, e.g., a measurement device such as illustrated in FIG. 14, or other programmable data processing device to produce a machine, such that the instructions, which execute via a processor of the device, implement the functions/acts specified.

It is noted that the values provided herein are to be construed to include equivalent values as indicated by use of the term "about." The equivalent values will be evident to those having ordinary skill in the art, but at the least include values obtained by ordinary rounding of the last significant digit.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method for measuring an analyte component of an aqueous sample, comprising:
    introducing an indicator solution to the aqueous sample, wherein the indicator solution comprises a plurality of micelles, wherein an indicator is within the micelles and the plurality of micelles is assembled from a cationic surfactant to form an indicator solution; and
    measuring an analyte component concentration of the aqueous sample, wherein the measuring comprises measuring a change in fluorescence in the aqueous sample, wherein the change in fluorescence is responsive to the analyte component interacting with the indicator, wherein the analyte component concentration is less than 100 parts-per-billion (ppb).

2. The method of claim 1, wherein the analyte component comprises fluoride and the indicator comprises a silane-fluorophore complex.

3. The method of claim 1, wherein the indicator comprises 7-triisopropylsiloxy-4-methylcoumarin (TIPS-Mumb).

4. The method of claim 1, wherein the indicator comprises 7-tert-butyl(diphenyl)siloxy-4-methylcoumarin (Ph2tBU-Mumb).

5. The method of claim 1, wherein the indicator comprises a silane-moiety.

6. The method of claim 1, wherein the cationic surfactant comprises cetyltrimethylammonium bromide.

7. The method of claim 1, wherein the cationic surfactant comprises benzyldimethylhexadecylammonium chloride.

8. The method of claim 1, wherein the cationic surfactant comprises dodecyltrimethylammonium bromide.

9. The method of claim 1, wherein the cationic surfactant extends a shelf life of the indicator.

10. The method of claim 1, wherein the change in fluorescence is correlated to a concentration of the analyte component of the aqueous sample.

11. A composition for measuring an analyte component in an aqueous sample, comprising:
    a silane-fluorophore complex indicator; and
    a plurality of micelles, wherein the silane-fluorophore complex indicator is within the micelles and the plurality of micelles is assembled from a cationic surfactant, wherein the analyte component concentration is less than 100 parts-per-billion (ppb).

12. The composition of claim 11, wherein the aqueous sample comprises fluoride.

13. The composition of claim 11, wherein the silane-fluorophore complex indicator comprises 7-triisopropylsiloxy-4-methylcoumarin (TIPS-Mumb).

14. The composition of claim 11, wherein silane-fluorophore complex indicator comprises 7-tert-butyl(diphenyl)siloxy-4-methylcoumarin (Ph2tBU-Mumb).

15. The composition of claim 11, wherein the silane-fluorophore complex indicator comprises a silane-moiety.

16. The composition of claim 11, wherein the cationic surfactant comprises cetyltrimethylammonium bromide.

17. The composition of claim 11, wherein the cationic surfactant comprises benzyldimethylhexadecylammonium chloride.

18. The composition of claim 11, wherein the cationic surfactant comprises dodecyltrimethylammonium bromide.

19. The composition of claim 11, wherein the cationic surfactant extends a shelf life of the indicator.

20. A composition for measuring fluoride in an aqueous sample, comprising:
   a silane-fluorophore complex indicator, wherein a change in fluorescence is based upon an interaction of the silane-fluorophore complex indicator and an amount of fluoride in the aqueous sample, wherein the amount of fluoride is less than 100 parts-per-billion (ppb); and
   a plurality of micelles, wherein the silane-fluorophore complex indicator is within the micelles and the plurality of micelles is assembled from a cationic surfactant.

* * * * *